March 21, 1967 W. S. CAHILL, SR 3,310,081
MOUNTING MANDREL FOR BUFFING MACHINES AND THE LIKE
Filed May 25, 1966 3 Sheets-Sheet 1

INVENTOR
WILLIAM S. CAHILL

BY Fisher, Christen, Sabol & Caldwell
ATTORNEYS

March 21, 1967   W. S. CAHILL, SR   3,310,081
MOUNTING MANDREL FOR BUFFING MACHINES AND THE LIKE
Filed May 25, 1966   3 Sheets-Sheet 3

INVENTOR
WILLIAM S. CAHILL

BY *Fisher, Christen, Sabol & Caldwell*
ATTORNEYS

United States Patent Office 3,310,081
Patented Mar. 21, 1967

3,310,081
MOUNTING MANDREL FOR BUFFING
MACHINES AND THE LIKE
William S. Cahill, Sr., 205 Robertson Ave.,
Danville, Va. 24541
Filed May 25, 1966, Ser. No. 552,929
8 Claims. (Cl. 144—288)

The present invention relates to an improved mounting apparatus for tires to be buffed, manufactured or otherwise worked upon, and inflated apart from a tire rim.

In particular, the invention finds greatest utility in connection with the process of recapping old tires where uniformity of results on successive tires, the handling of different size tires, and a high rate of productivity is desired.

Basically, the invention comprises a tire mounting mandrel readily assemblable to a drive mechanism of a buffing machine or the like. A drum or rotatable frame is mounted to the buffer spindle or other connection in driving relation thereto, and includes an air passage opening at its periphery. A pair of tire receiving flanges is adapted to be slipped onto the drum periphery, in spaced-apart relation and in air-tight seal thereto. Thrust plate guiding means are carried by the drum, in spaced-apart locations along at least one peripheral edge thereof, to receive slide rails adapted to extend beyond the peripheral edge of the drum to retain the removable tire receiving flanges, inflation of the tire serving to press outwardly on the flanges thereby insuring their proper placing and retention.

The slide rails are carried in rotatable fashion, relative to the drum, to permit withdrawing them below the drum peripheral edge for ready changing of the tire receiving flanges, thereby quickly accommodating all size tires. Means are provided for locking the slide rails in their tire receiving flange retaining and flange removal positions.

A novel air passageway permits the air intake nipple to rotate with an air collar relative to the tire inlet air pressure opening, which is fixed in the drum periphery.

The foregoing combination enables the use of a minimum amount of material, preferably aluminum, in the construction of the various tire receiving flanges to accommodate all sizes of tires while permitting the use of higher air pressure with greater safety, less air consumption and less area to inflate, but avoiding hazardous conditions due to overinflation. The operator's work load is minimized through faster tire mounting and less work in changing flanges, thereby enabling less buffing time per tire. Greater precision buffing is also permitted through the use of this invention.

With the foregoing in mind it is one of the objects of the invention to provide a simplified tire mounting mandrel.

A further object is the provision of such a mandrel capable of quickly and removably mounting various size tire receiving flanges.

Another object of the invention is the provision of unique thrust plate and slide rail means for retaining the tire receiving flanges in one position, but permitting ready removal of the slide rails to a further position, for replacement of the tire receiving flanges with simple locking provisions for each position.

A still further object is the provision of such a simplified tire mounting mandrel in which inlet air to the tire is delivered at a fixed location relative to the drum but the inlet to the drum air passageway is movable relative to the drum.

These and other objects will become more apparent to those skilled in the art from the following detailed description, when read in the light of the accompanying drawing wherein.

Figure 1:
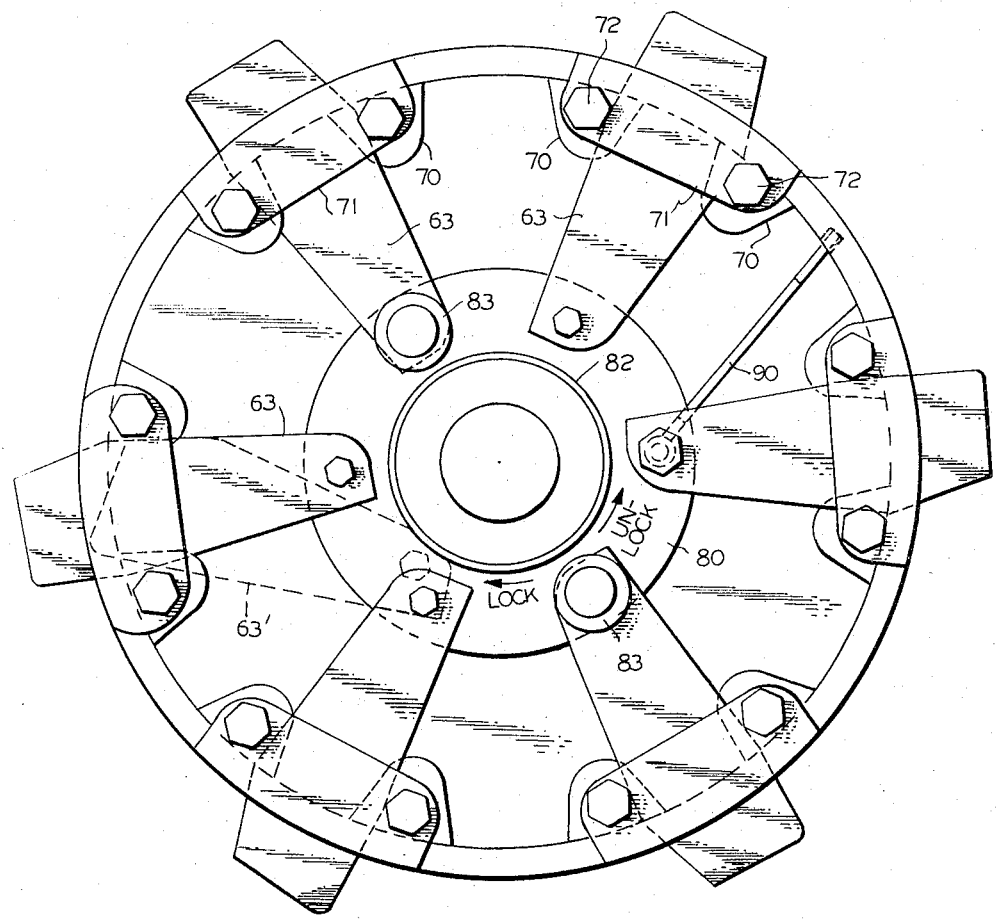
FIG. 1 is a view in side elevation of the tire mounting mandrel.

Referring now to the drawing, the tire mounting mandrel 11, generally comprises a rigid drum 13 adapted for ready driving assembly with a buffing machine spindle 15 (FIG. 2), having a driving flange 17 welded thereto, as at 19. The drum 13 includes a key 21 adapted to fit a keyway (not shown) in spindle 15, with retaining nut 23 locking the drum 13 in driving engagement with the flange 17 and spindle 15.

The air passageway includes input nipple 25 on air collar 27, in communication with a first passageway 29. The latter is in communication with annular passageway 31, disposed between O-rings 33, located in air collar 27. A single horizontal passageway 35 extends into vertical passageway 37 which exists at orifice 39 at the periphery of drum 13, a conventional safety valve 40 (i.e. a Watts No. 53), being connected in the system for safety.

The tire receiving flanges 51 and 53 are adapted to slide onto the outer periphery of drum 13, with inner flange 51 abutting drum ridge 55. An O-ring 57, carried by flange 51, insures an air-tight seal with the drum periphery. Also, it should be noted that the inner arcuate surface 51' of flange 51 is shaped to include an arcuate angle, in excess of 90°, thereby insuring a good seal with tire 60.

Figure 2:
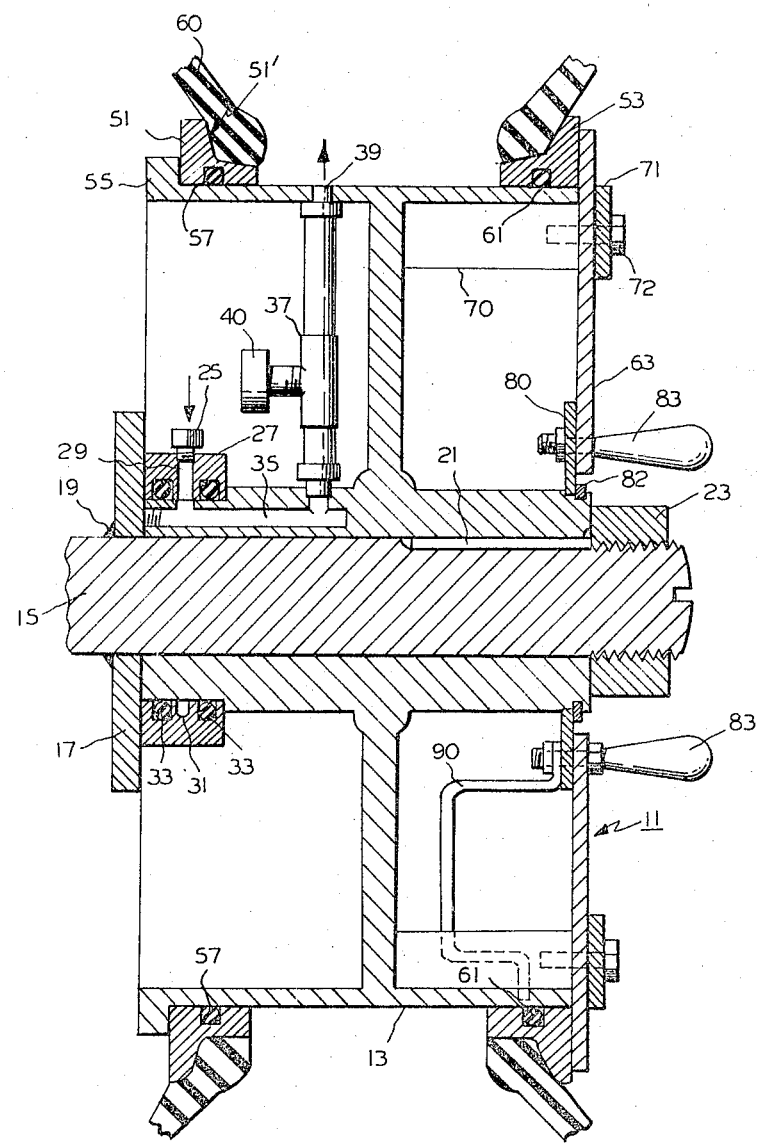
FIG. 2 is a view of the mandrel in cross-section.

The other flange 53, also carries an O-ring seal 61, and is adapted to be retained in position by slide rails 63 when in their extended position, as shown in FIGS. 1 and 2, such that they protrude beyond the outer peripheral diameter of drum 13. Air pressure maintains the flanges 51 and 53 in their spaced-apart position, as depicted.

The right hand peripheral edge of drum 13 carries lugs 70, to which are bolted thrust plates 71, by bolts 72. The thrust plates 71 are spaced apart about the peripheral edge of drum 13, in pairs, to receive and guide the slide rails 63.

Slide rails 63 are pivotally connected to annular plate 80, which is in turn rotatably mounted on the inner hub of drum 13 and retained by snap ring 82. Handles 83 permit ready rotation of plate 80, relative to drum 13, to retract the slide rails 63 to the dotted position shown in 63' in FIG. 1. The locking position, with the slide rails 63 extended, is attained through clockwise movement of annular plate 80, and the unlocked position, through counterclockwise movement thereof, looking at FIG. 1.

An expansion spring 90 is provided between the periphery of drum 13 and the plate 80 to fix the slide rails 63 in their locked, and in their unlocked positions, because rotation of annular plate 80 causes the spring to pass over the center in each direction.

It should now be appreciated how readily the tire receiving flanges may be changed, simply by revolving handles 83 to retract slide rails 63. Also, it should be pointed out that the slide rails 63 remain the same for all diameter tires. Only the tire mounting flanges are changed to accommodate different size tires. For example, when changing from a 12-inch inside diameter tire to a 22.5-inch inside diameter tire, a set of different diameter mounting flanges is employed. The drum 13 diameter is fixed, and its periphery always receives the different diameter mounting flanges. If the flanges are made of aluminum, handling is readily facilitated and, since the drum generally stays on the machine at all times, it is only necessary to switch flanges, the flanges having the same inside diameters but different outside diameters.

Figure 3:
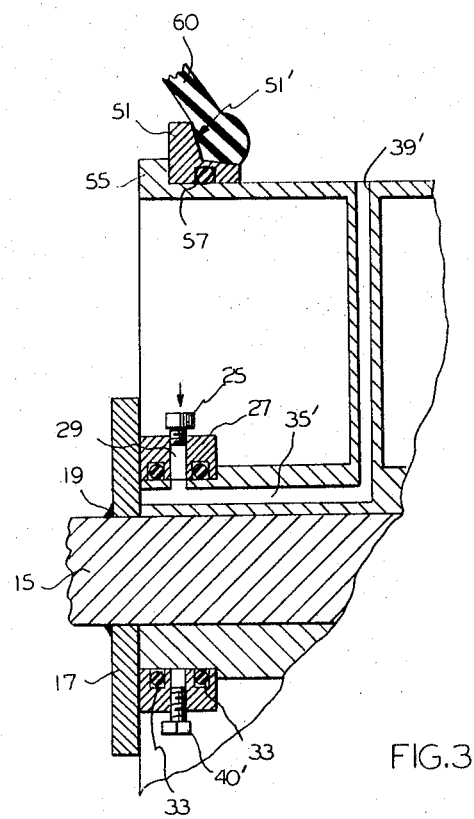
FIG. 3 is a partial view of the mandrel in cross-section showing an alternative air control passageway.

A simpler arrangement from a manufacturing point of view for the inlet air is shown in FIG. 3 wherein passageway 35' is in direct communication with passageway 39', both being formed in the drum frame. Air safety valve 40 is in connection with air collar 31. It will, of course, be appreciated that in function the alternative air control passage means are equivalent.

While I have disclosed the preferred embodiment of my invention, nevertheless other modifications will readily occur to those skilled in the art, as for example, the use of slide rails on both peripheral edges of the drum, which may be desirable under certain circumstances, and accordingly it is intended that the scope of the invention be limited only by the scope of the claims appended hereto.

What is claimed is:

1. For use with a buffing machine and the like having a spindle drive mechanism, a tire mounting mandrel comprising, in combination a drum; means securing the drum to the spindle drive mechanism in driving relation thereto; said drum having an air passage opening at a fixed location in its periphery; a pair of tire receiving flanges removably carried by the drum periphery; thrust plate guiding means carried by the drum at spaced locations along at least one peripheral edge thereof; slide rails; means rotatable relative to the drum for carrying the slide rails and moving said rails relative to the guiding means outwardly and inwardly of the drum periphery; and means for locking the slide rails against movement.

2. For use with a buffing machine and the like having a drive mechanism, a tire mounting mandrel comprising, in combination a drum adapted to be secured to the drive mechanism in driving relation thereto; said drum having an air passage opening at its periphery; a pair of tire receiving flanges removably carried by the drum periphery; guiding means carried by the drum at spaced locations along at least one peripheral edge thereof; means rotatable relative to the drum for projecting inwardly and outwardly relative to the drum periphery through the guiding means; and means for locking the projecting means against movement.

3. The mandrel of claim 2 wherein said tire receiving flanges include arcuate surfaces defining arcs in excess of 90 degrees for receiving tire casing flanges.

4. The mandrel of claim 2 further comprising an air collar having a first air passage movably mounted on the drum in air sealing relation thereto; said drum having a hub including an annular air passage in communication with said first passage, said drum including second and third air passages in communication between the annular air passage and the air passage opening; and an air safety valve in communication with one of said passages.

5. The mandrel of claim 4 wherein said second and third air passages and said safety valve are fixed relative to said drum and air passage opening; and said air passage opening is located on the drum periphery between said tire receiving flanges.

6. The mandrel of claim 2 wherein said guiding means comprises a plurality of pairs of spaced-apart lugs; and plates affixed between the lugs of each pair in spaced positions from an outer edge of the drum adjacent the periphery thereof.

7. The mandrel of claim 6 wherein said drum includes a hub and said projecting means comprises an annular plate rotatably carried by said hub and a plurality of slides carried by the annular plate and respectively disposed between the lugs of the pairs and retained by the drum edge and plates affixed between the lugs of each of said pairs.

8. The mandrel of claim 7 wherein said locking means comprises spring means connected between the drum and the annular plate for locking the slides inwardly and outwardly relative to the drum periphery.

References Cited by the Examiner

UNITED STATES PATENTS

| | | | |
|---|---|---|---|
| 1,008,652 | 11/1911 | Kremer. | |
| 2,197,808 | 4/1940 | Mason. | |
| 2,351,355 | 6/1944 | Merrett | 144—288 |
| 2,818,108 | 12/1957 | Wells | 157—1.2 |
| 2,824,336 | 2/1958 | Weigold | 18—2 |
| 2,992,675 | 7/1961 | Bakke | 157—13 |

WILLIAM W. DYER, JR., *Primary Examiner.*

RALPH J. ZLOTNIK, *Assistant Examiner.*